(12) United States Patent
Dural et al.

(10) Patent No.: US 9,374,727 B2
(45) Date of Patent: Jun. 21, 2016

(54) CALIBRATION AND TRACKING TO ASSIST INTER-FREQUENCY MEASUREMENTS OF LTE CELL BY WLAN RADIO

(71) Applicant: QUALCOMM Incorporated, San Diego, CA (US)

(72) Inventors: Ozgur Dural, San Diego, CA (US); Kaushik Chakraborty, San Diego, CA (US); Soumya Das, San Diego, CA (US); Bongyong Song, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/198,456

(22) Filed: Mar. 5, 2014

(65) Prior Publication Data

US 2015/0257020 A1  Sep. 10, 2015

(51) Int. Cl.
*H04W 24/08* (2009.01)
*H04W 24/10* (2009.01)
(Continued)

(52) U.S. Cl.
CPC .............. *H04W 24/08* (2013.01); *H04W 24/10* (2013.01); *H04B 17/21* (2015.01); *H04B 17/27* (2015.01); *H04B 17/318* (2015.01); *H04W 84/12* (2013.01)

(58) Field of Classification Search
CPC ................................ H04L 47/10; H04L 43/50
USPC ......................................................... 370/252
See application file for complete search history.

(56) References Cited

U.S. PATENT DOCUMENTS

| | | | |
|---|---|---|---|
| 5,970,407 A | 10/1999 | Brunner et al. | |
| 7,339,909 B2 | 3/2008 | Kotzin | |

(Continued)

FOREIGN PATENT DOCUMENTS

| | | |
|---|---|---|
| WO | 2010033413 | 3/2010 |
| WO | 2012110420 A1 | 8/2012 |
| WO | 2013034585 A1 | 3/2013 |

OTHER PUBLICATIONS

3GPP: "3rd Generation Partnership Project; Technical Specification Group Radio Access Network; Study on Wireless Local Area Network (WLAN)—3GPP radio interworking (Release 12)", 3GPP Draft; 37834-000, 3rd Generation Partnership Project (3GPP), Mobile Competence Centre ; 650, Route Des Lucioles ; F-06921 Sophia-Antipolis Cedex ; France, Jan. 7, 2014, XP050917326, 17 pages.

(Continued)

*Primary Examiner* — Melvin Marcelo
*Assistant Examiner* — Peter Solinsky
(74) *Attorney, Agent, or Firm* — Arent Fox LLP

(57) ABSTRACT

An apparatus for wireless communication obtains a first metric of a cell based on signals received by a WWAN radio tuned to a common frequency, and a second metric of the cell based on signals received by a WLAN radio tuned to the common frequency. The apparatus determines a calibration factor based on the first and second metrics, and performs cell search and cell measurement based on the calibration factor and signals received by the WLAN radio tuned to a target frequency. The common frequency may be a serving frequency of the WWAN, in which case the first and second metrics are one of frequency or power metrics and the calibration factor is one of a frequency offset and a power offset. The common frequency may also be a target frequency for inter-frequency measurements of the WWAN, in which case the calibration factor is based primarily on power measurements.

28 Claims, 10 Drawing Sheets

(51) Int. Cl.
*H04W 84/12* (2009.01)
*H04B 17/21* (2015.01)
*H04B 17/27* (2015.01)
*H04B 17/318* (2015.01)

(56) References Cited

U.S. PATENT DOCUMENTS

| | | | |
|---|---|---|---|
| 7,969,930 B2 | 6/2011 | Kalhan | |
| 2004/0072582 A1* | 4/2004 | Aljadeff et al. | 455/456.1 |
| 2004/0102158 A1 | 5/2004 | Schwarz et al. | |
| 2007/0025265 A1* | 2/2007 | Porras et al. | 370/252 |
| 2007/0171910 A1* | 7/2007 | Kumar | H04L 63/0428 370/392 |
| 2008/0075033 A1* | 3/2008 | Shattil | H04B 7/026 370/328 |
| 2009/0040996 A1* | 2/2009 | Laroia | H04W 72/06 370/343 |
| 2009/0098873 A1* | 4/2009 | Gogic | 455/436 |
| 2010/0056145 A1* | 3/2010 | Hashimoto et al. | 455/435.2 |
| 2011/0009060 A1* | 1/2011 | Hsu | H04W 52/16 455/41.2 |
| 2011/0269449 A1* | 11/2011 | Kazmi et al. | 455/422.1 |
| 2012/0039265 A1* | 2/2012 | Patel et al. | 370/329 |
| 2012/0108288 A1 | 5/2012 | Montemurro et al. | |
| 2012/0169535 A1 | 7/2012 | Kong et al. | |
| 2012/0315905 A1* | 12/2012 | Zhu et al. | 455/436 |
| 2013/0003880 A1 | 1/2013 | Lu et al. | |
| 2013/0135148 A1* | 5/2013 | Fix et al. | 342/387 |
| 2013/0189971 A1* | 7/2013 | Callender et al. | 455/423 |
| 2013/0201884 A1* | 8/2013 | Freda et al. | 370/278 |
| 2013/0259016 A1* | 10/2013 | Xhafa | H04W 84/18 370/338 |
| 2014/0038598 A1* | 2/2014 | Ren et al. | 455/434 |
| 2014/0057624 A1 | 2/2014 | Murgan et al. | |
| 2014/0179311 A1* | 6/2014 | Liang et al. | 455/434 |
| 2014/0179340 A1* | 6/2014 | Do | G01S 13/765 455/456.1 |
| 2014/0337976 A1* | 11/2014 | Moeller et al. | 726/23 |
| 2015/0092686 A1* | 4/2015 | Cui et al. | 370/329 |
| 2015/0189516 A1* | 7/2015 | Seo | H04L 5/001 370/329 |
| 2015/0257016 A1 | 9/2015 | Dural et al. | |

OTHER PUBLICATIONS

Broadcom Corporation: "Limitations on WLAN measurements for WLAN/3GPP Radio Interworking," 3GPP Draft; R2-133157-WLAN-3GPP-Interworking-WLAN-Measurement-Limitations-Ljubljana, 3rd Generation Partnership Project (3GPP), Mobile Competence Centre; 650, Route Des Lucioles; F-06921 Sophia-Anti, vol. RAN WG2, no. Ljubljana, Slovenia; Oct. 7, 2013-Oct. 11, 2013, Sep. 28, 2013, XP050719110, 10 pages.
International Search Report and Written Opinion—PCT/US2015/018515—ISA/EPO—Jun. 15, 2015.

* cited by examiner

… (1)

CALIBRATION AND TRACKING TO ASSIST INTER-FREQUENCY MEASUREMENTS OF LTE CELL BY WLAN RADIO

BACKGROUND

1. Field

The present disclosure relates generally to communication systems, and more particularly, to a calibration and tracking to assist inter-frequency measurement of LTE cell by wireless local area network (WLAN) radio.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus for wireless communication obtains a first metric of a cell based on signals received by a wireless wide area network (WWAN) radio tuned to a first frequency, and a second metric of the cell based on signals received by a wireless local area network (WLAN) radio tuned to the first frequency. The apparatus determines a calibration factor based on the first metric and the second metric, and subsequently performs one or more cell search and cell measurement based on the calibration factor and signals received by the WLAN radio tuned to a second frequency which may be the target frequency for measurements.

In the case of single carrier mode, the first frequency may be a serving frequency on which the WWAN radio is or was tuned, and in the case of carrier aggregation mode, the first frequency may be a frequency where one of a plurality of component carriers is configured. The first frequency may be a frequency or one of the frequencies where cell measurements are to be done. More generally, the first frequency may be any possible frequency where the WWAN radio and the WLAN radio can both tune, including a previous WWAN serving frequency or a frequency where previous cell measurements were done.

In one example configuration, the first frequency may be a serving frequency on which the WWAN is or was tuned to, in which case the first and second metrics are one of a frequency metric or a power metric and the calibration factor is one of a frequency offset and a power offset. In another example configuration, the first frequency may also be a target frequency for inter-frequency measurements for the WWAN radio, in which case the calibration factor is based frequency or power metrics.

DETAILED DESCRIPTION

Figure 1:
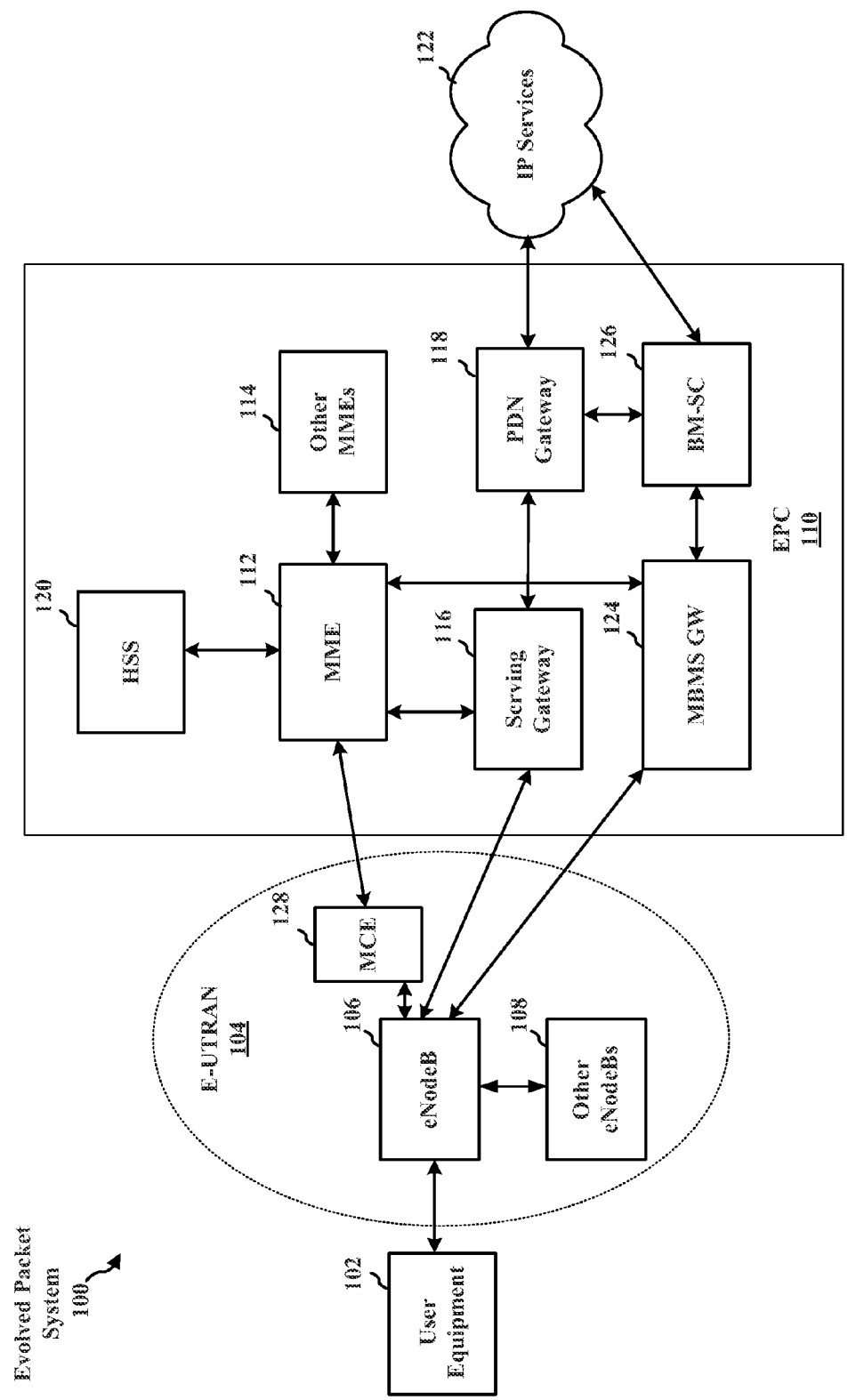
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity these entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway (SGW) 116, a Multimedia Broadcast Multicast Service (MBMS) Gateway 124, a Broadcast Multicast Service Center (BM-SC) 126, and a Packet Data Network (PDN) Gateway (PGW) 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a Public Land Mobile Network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
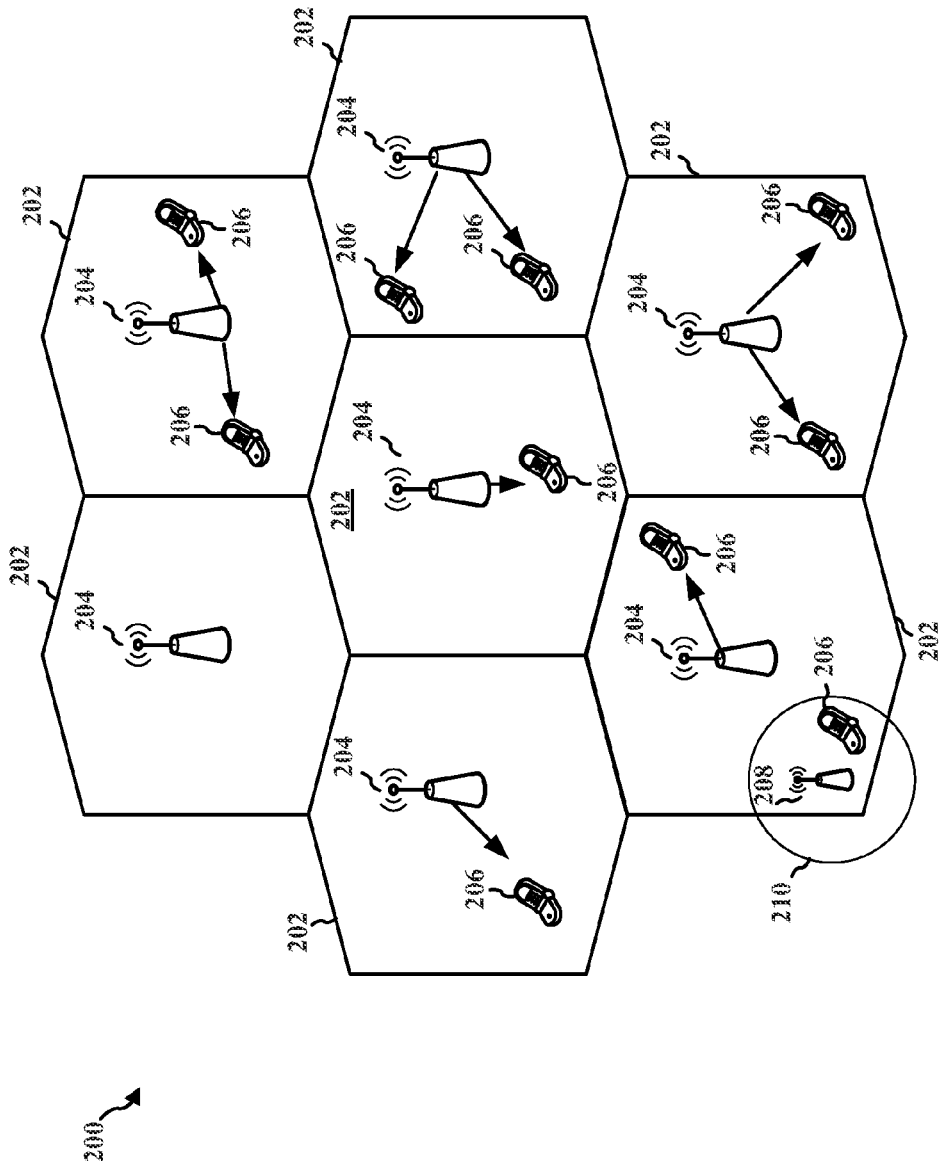
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDMA is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
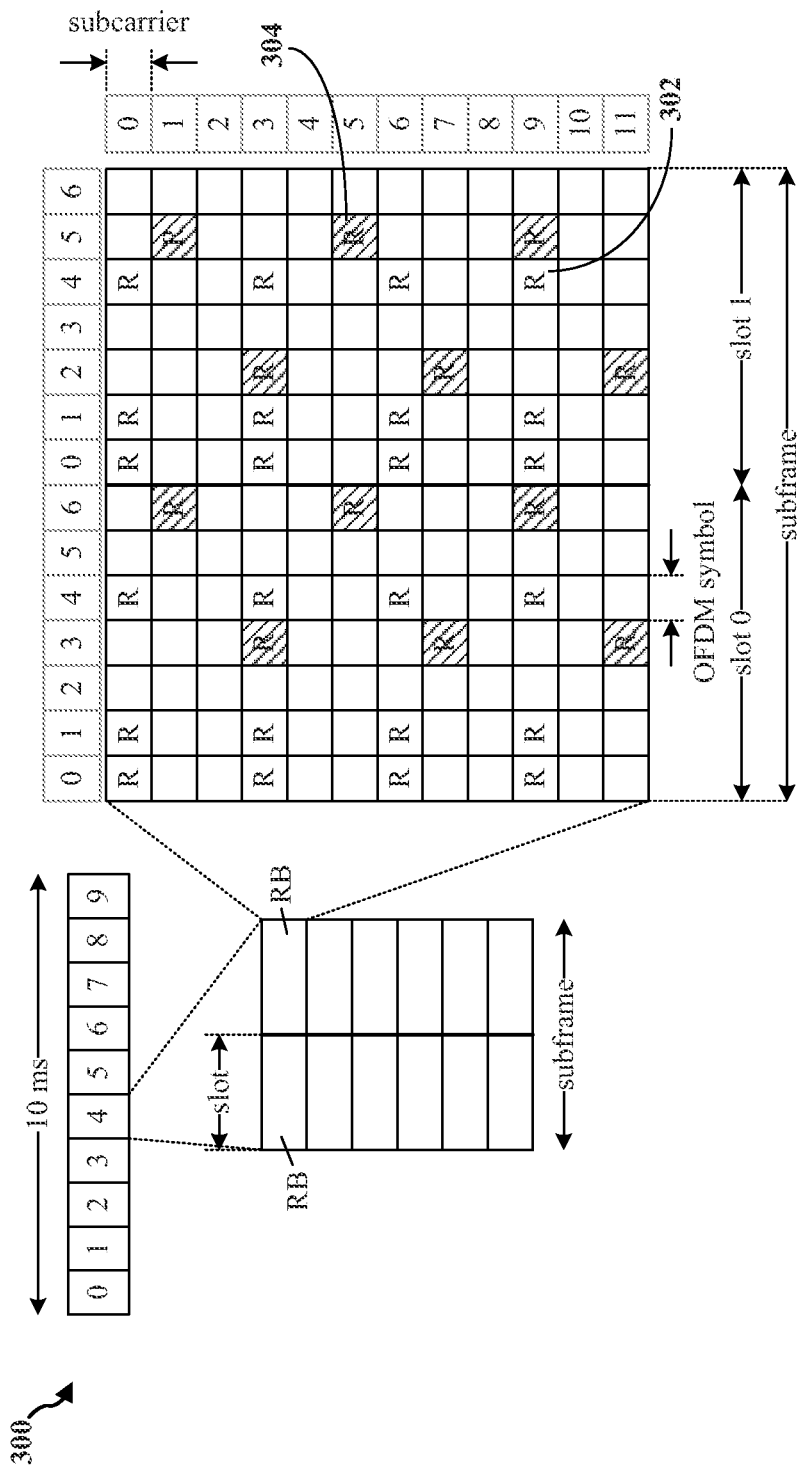
FIG. 3 is a diagram illustrating an example of a DL frame structure in LTE.

FIG. 3 is a diagram 300 illustrating an example of a DL frame structure in LTE using normal cyclic prefix. A frame (10 ms) may be divided into 10 equally sized subframes each of duration 1 ms. Each subframe may include two consecutive time slots. A resource grid may be used to represent two time slots, each time slot including a resource block. The resource grid is divided into multiple resource elements. In LTE, a resource block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource block may contain 6 consecutive OFDM symbols in the time domain, or 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
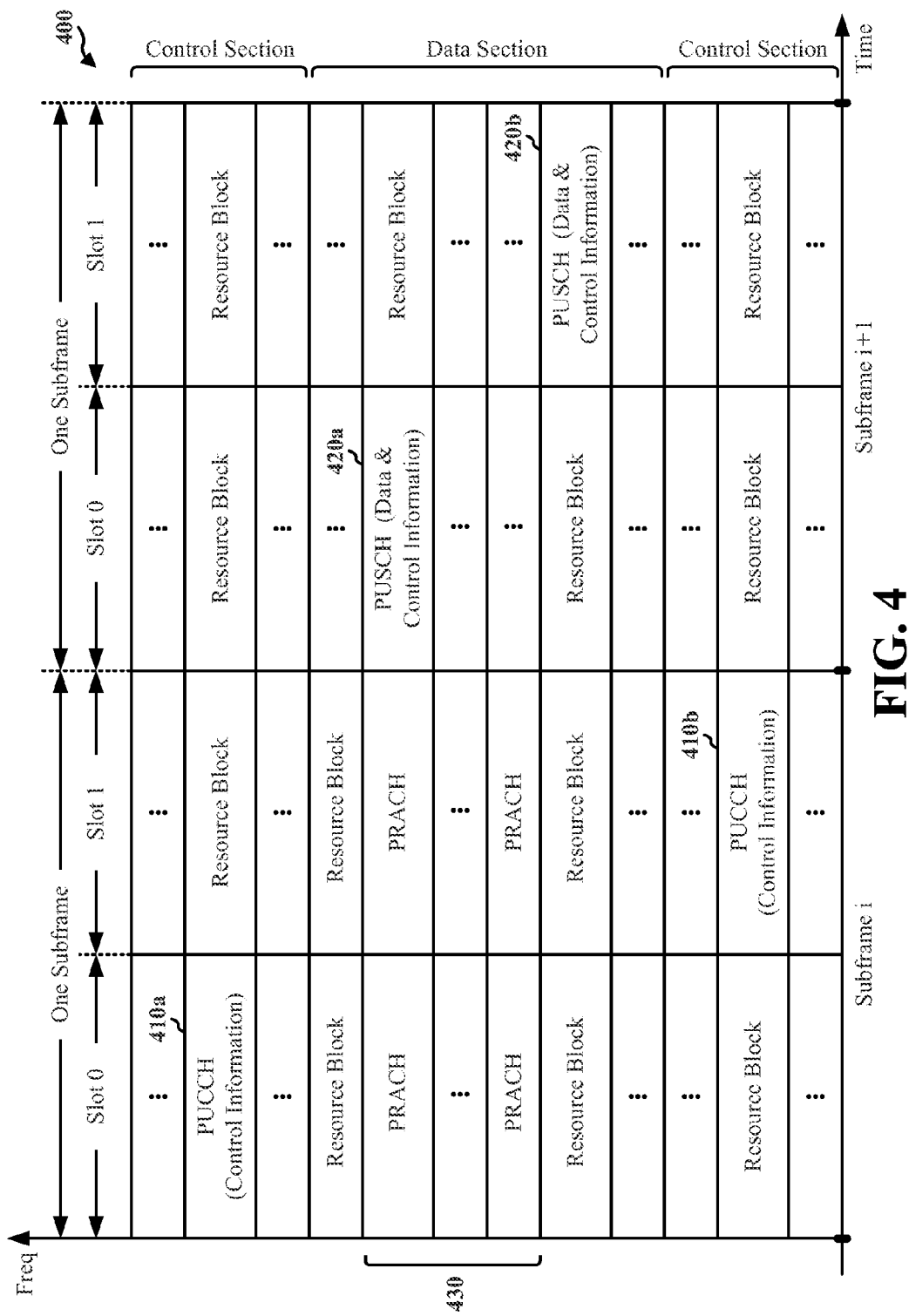
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
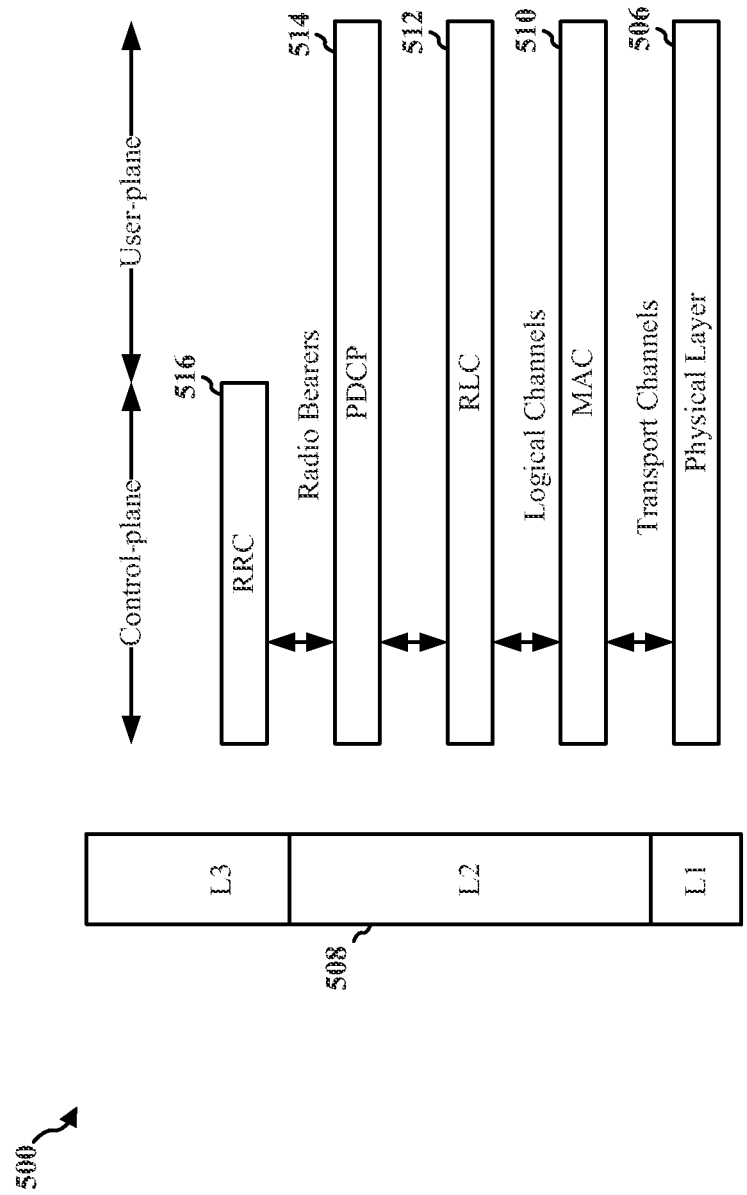
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
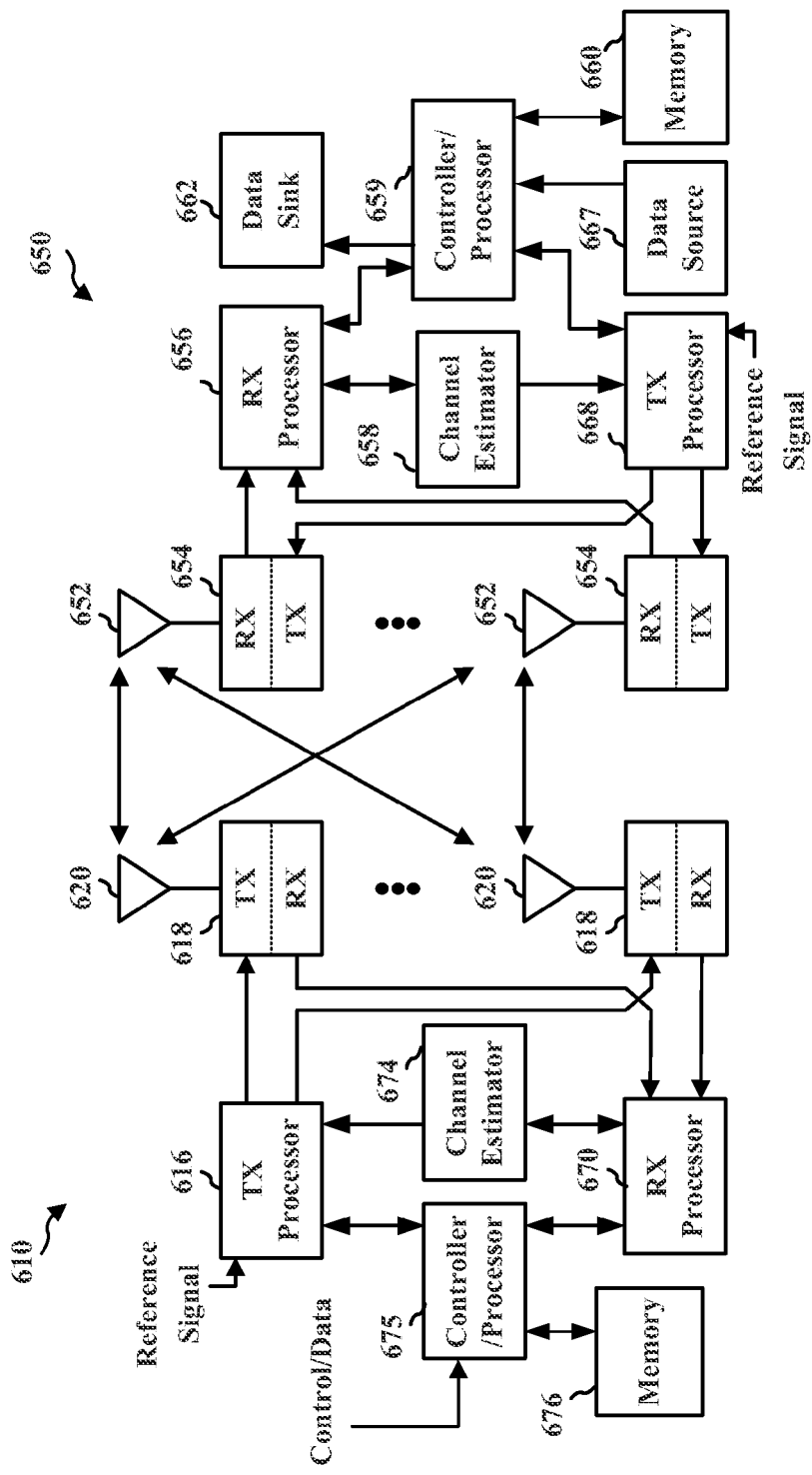
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
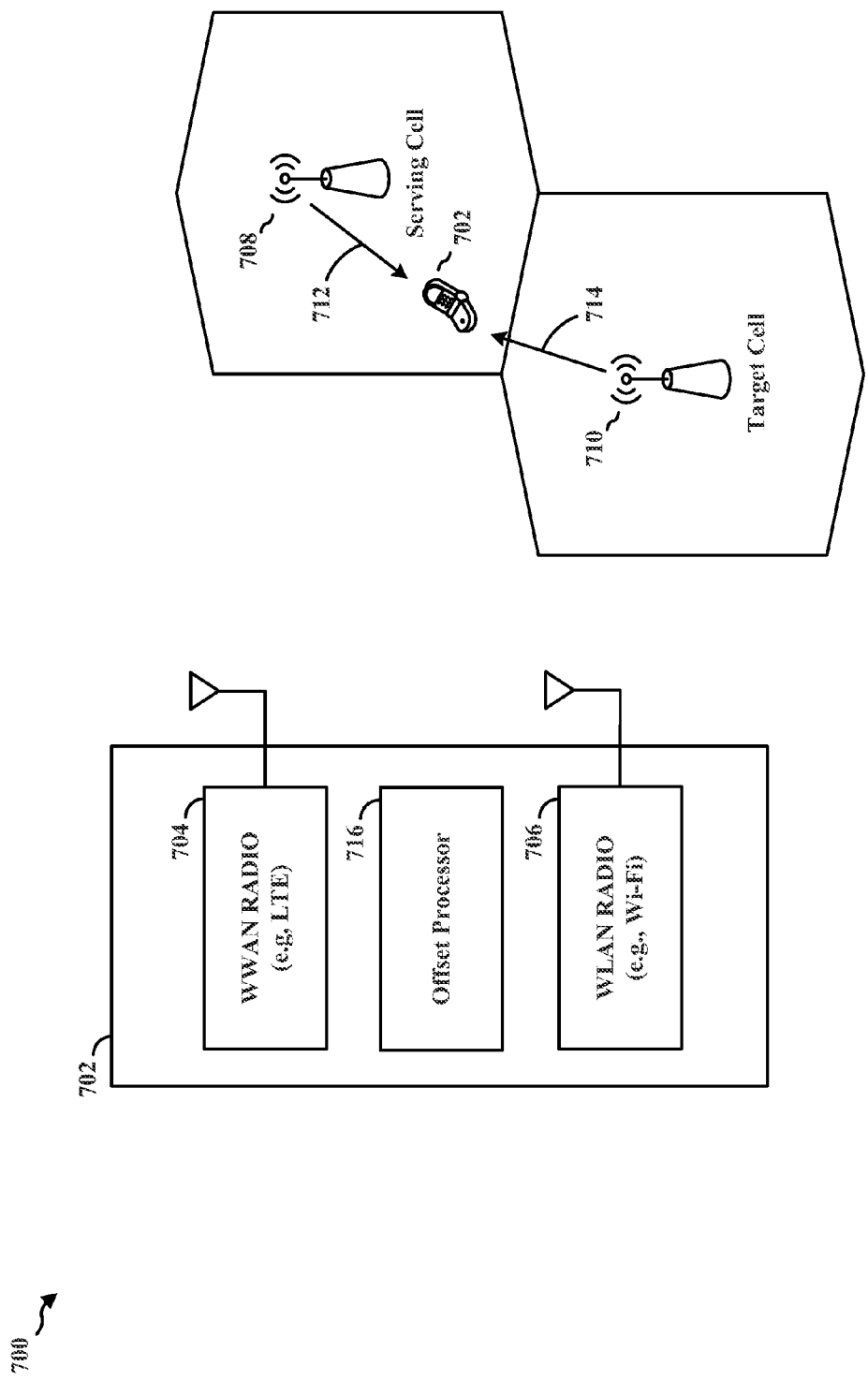
FIG. 7 is an illustration of a UE with multiple radios.

FIG. 7 is an illustration 700 of a UE 702 with multiple radios. The UE 702 may contain a WWAN (2/3/4G LTE) radio 704 and WLAN (802.11) radio 706. Although WWAN radios and WLAN radios are initially designed for specific communication needs, with advances in technology and needs for higher data rates, the use of these two types of radios has started to overlap. It is possible to use a WLAN modem 706 whenever it is available to assist the WWAN modem 704 and vice versa. One such assistance can be during inter-frequency measurements for LTE. For example, when the UE 702 is in connected mode with a serving cell 708, the WLAN radio 706 may assist in cell search and cell measurement for LTE at other frequencies than the serving cell frequency. For example, a UE 702 may need to monitor neighboring cells for potential handovers when the serving cell signal strength becomes weak compared to a predefined threshold. When the neighbor cell is on a frequency different than the current serving frequency, the neighbor cell search and measurement is an inter-frequency cell search and measurement. The carrier frequency of a "target" inter-frequency neighbor cell 710 is referred to as "target frequency." When the target frequency is sufficiently apart from the serving cell frequency, the measurements on target frequency will require the UE 702 to tune away from its serving frequency. Note that the target frequency may belong to the same frequency band as the serving frequency, or it may belong to a different frequency band.

In a baseline operation of a UE 702 having both a WWAN modem 704 and a WLAN modem 706, the WLAN radio may be used to measure one or more target cells 710 on one or more target frequencies, while the WWAN modem measures serving cells 708 on the serving frequency. As used herein, a "serving cell" 708 is a cell with which the WWAN modem 704 is currently connected to, i.e., has a radio connection. The serving cell 708 has a base station that communicates with the WWAN modem 704 of the UE 702 over a serving frequency. An inter-frequency cell referred to as the "target cell" 710 is the cell where the WWAN modem 704 needs to tune away to do inter-frequency measurements on frequencies different from the serving frequency.

Assistance from the WLAN radio 706 is beneficial because performance of inter-frequency cell search and measurements by the LTE modem 704 itself requires the UE to tune away from the serving frequency, and thus the serving cell, to other frequencies to obtain measurements. The LTE modem 704 may tune away during specified times referred to as measurement gaps. The inter-frequency measurement gaps are configured by the serving eNB allowing the UE to tune away from serving frequency for inter-frequency cell search and measurement. The UE is not scheduled any DL packets during these measurement gaps and thus is not receiving any data from the serving cell 708. Similarly the UE cannot transmit UL packets during these measurement gaps to the serving cell 708. This results in loss of DL and UL throughput as opposed to the case where the UE is not scheduled any measurement gaps.

The use of the WLAN modem 706 to assist inter-frequency measurements avoids measurement gaps, results in higher throughput and better user experience. The WLAN modem 706 may be in idle mode while the WWAN modem 704 is in connected mode. Thus, the WLAN modem 706 is available for assisting inter-frequency WWAN measurements. Even when the WLAN modem 706 is in connected mode, the WLAN modem 706 can create gaps in WLAN Tx/Rx for the WWAN inter-frequency measurements if needed.

Use of the WLAN modem 706 to obtain inter-frequency measurements has several associated issues. A first issue relates to frequency offset. A WWAN modem 704 and a WLAN modem 706 may have independent clock sources that may have same or different clock frequency offsets. Any known frequency offset estimate for the WWAN modem is not relevant to the WLAN modem 706 since the respective modems are running on different crystals with independent frequency offsets. The frequency tracking loop (FTL) for WWAN modem in the UE (based on wideband reference signal measurements from the serving frequency) cannot be used to correct frequency offset for a target cell 710 in another frequency/band when the inter-frequency measurements are done by the WLAN radio 706. An additional aspect of frequency offset may be present when the clock source for the WLAN modem 706 has a larger inaccuracy than the clock source of the WWAN modem 704. In this case, the WLAN modem 706 might have larger range of frequency offsets when tuned to a certain frequency than the LTE modem 704. Accordingly, the algorithms developed for the LTE modem 704 which has better accuracy will not perform as needed with the WLAN modem 706 if the accuracy is less.

A second issue relates to different power levels. The LTE modem 704 and the WLAN modem 706 are connected to set of antennas which are disjoint. For example, the LTE antenna(s) and WLAN antenna(s) are located in different places on the mobile device. When the WLAN modem 706 is asked to help with cell search and cell measurement, it is possible that the power measured by the WLAN antenna(s) is different that the power measured by the LTE antenna(s). This might be the result of a hand covering one antenna but not the other, or any kind of different blockage seen by one antenna verses other antenna. Accordingly, cell search parameters, e.g., primary synchronization signal (PSS) signal-to-noise ratio (SNR), secondary synchronization signal (SSS) SNR, and cell measurements, e.g., reference signal received power (RSRP), reference signal strength indicator (RSSI), by a WLAN radio 706 and a WWAN radio 704 may need calibration as there could be offsets in the measurements, due to different low noise amplifier (LNA) gain states, automatic gain control (AGC), and hand gripping over the antenna.

A third issue relates to timing offset. Because the WWAN modem 704 and the WLAN modem 706 do not have a common clock source, there will be a timing offset between the two modems. If the frequency offset between the two modems is not corrected, then the timing offset will continue to accumulate and introduce significant timing errors, which in turn will introduce errors in cell search and measurement algorithms.

Concepts disclosed herein address the foregoing issues by deriving calibration factors from metrics obtained by both a WWAN modem and a WLAN modem on the same cell or cells on the same frequency. The same frequency may be any possible frequency where the WWAN radio and the WLAN radio can both tune, including a previous WWAN serving frequency or a frequency where previous cell measurements were done. The calibration factor may then be applied on the WLAN chain to correct the power and frequency offsets of subsequent signals receive by the WLAN radio.

In a first concept, as an initial setup process, the WLAN modem 706 tunes to a first frequency of the serving cell 708, which the WWAN modem 704 is on, and collects samples, e.g., digital samples, of over the air signals 712. In the case of single carrier mode, the first frequency may be a serving frequency on which the WWAN radio is or was tuned, and in the case of carrier aggregation mode, the first frequency may be a frequency where one of a plurality of component carriers is configured. The UE 702 performs cell search, and obtains cell measurements, including power estimations and frequency estimations, of the serving cell 708 based on these samples. The initial setup process may be performed at startup of the UE 702, while the LTE modem 704 of the UE is already in connected mode with the serving cell 708 and obtaining its own signal samples for cell search and for cell measurements, e.g., frequency estimation and power estimation. The samples collected by the WLAN modem 706 and the samples collected by WWAN modem 704 are both processed to obtain cell search parameters, e.g., PSS SNR, SSS SNR, and cell measurements, e.g., RSRP, RSSI, RSRQ etc.

From these respective WWAN-obtained cell metrics and WLAN-obtained cell metrics, the UE 702 is able to determine differences between corresponding power estimations and frequency estimations. For example, signal samples acquired by the LTE modem 704 may have resulted in a power estimation of −100 dBm, while signals received by the WLAN modem 706 may have resulted in a power estimation of −97 dBm. Accordingly, the power estimation difference or offset between the respective measurements is 3 dB. A similar difference value may be obtained with respect to frequency measurements. The unit of frequency may be an absolute unit like Hz or multiples of that, or a relative unit like parts per million (ppm).

In one implementation, the determined power estimation offset and the frequency offset values are provided to an offset processing module 716. Subsequent cell search and measurement samples, e.g., digital samples, obtained by the WLAN modem 706 from an over the air signals 714 on a carrier frequency of a target inter-frequency neighbor cell are provided to the offset processing module 716. The offset processing module 716 applies the previously determined offsets to the samples to obtain corrected samples and then performs further processing of these corrected samples to obtain cell search and measurements. The LTE modem 704 recognizes the samples as coming from the WLAN modem 706 and applies the offsets to obtain frequency and power measurements. For samples obtained by the LTE modem 704, the LTE modem processes the samples using its own offsets.

Depending on the target frequency, a further adjustment of an offset may occur. For example, if the target frequency is different from the serving frequency upon which the offset is based, the offsets may be adjusted for the target frequency before being applied. An example is frequency offset error at a target frequency. One way to apply the correction is outlined below for two cases, when the frequency offset is in (a) Hz and (b) ppm.

When frequency offset is in Hz, the adjusted frequency offset is calculated as follows:

> Adjusted frequency offset=frequency offset for the first frequency×(second frequency/first frequency).

When the frequency offset is in ppm the adjusted frequency offset is calculated as follows:

> Adjusted frequency offset=frequency offset for the first frequency×the second frequency.

As describe above, the WLAN modem 706 tunes to the serving cell 708 ahead of time and acquires the serving frequency to provide better accuracy. When the LTE modem 704 asks for assistance to collect samples at another frequency, such as a target frequency, the WLAN modem 706 immediately starts the process of collecting samples at the target frequency. Tuning to the serving cell 708 by the WLAN modem 706 may be done once at the start up and/or may be repeated at some periodicity dictated by the availability of the resources such as availability of the WLAN modem and power consumption by this operation and the accuracy required for estimation.

The WLAN modem 706 tunes to the serving cell 708 and makes a power measurement, e.g., RSRP, of the serving cell and overall received power to be used in calculations for reference signal received quality (RSRQ). Since the LTE modem 704 is already in connected mode with the serving cell 708, it has a good estimate of the power of the serving cell. The differences between the power estimates obtained through the WLAN antenna and the power estimates obtained through the LTE antenna give the power estimation offsets between the WWAN RF chain and the WLAN RF chain. These offsets could be used to adjust subsequent cell measurement results obtained through the WLAN antenna to reflect the desired value as if the measurements were done through the LTE antenna.

In cases where the WLAN modem 706 has a larger inaccuracy than the LTE modem 704, frequency offset estimation may be performed as follows. In a first implementation, the WLAN modem 706 tunes to a first frequency, which may correspond to the serving frequency on which the WWAN radio is or was tuned, and collects digital samples. The UE 702 performs a cell search based on these samples at several frequency offset hypotheses. For example, for initial estimation of large frequency offset, the UE may need to detect a known sequence (e.g. PSS). The UE 702 selects the one frequency offset which gives the best, e.g., peak, cell search result. The UE 702 then proceeds to the normal operation for frequency offset calculation to fine tune the estimation. By the first three steps of the above procedure, the error in the frequency offset is reduced to a normal LTE modem frequency offset error. The last step gives the result of the estimation with required accuracy. The number of frequency hypotheses is dictated by the ratio of the clock offset error/inaccuracy of WLAN modem to LTE modem.

It is possible to reduce the number of hypotheses tested, as follows: First, the UE starts with frequency fo as a baseline frequency, and the WLAN modem 706 obtain samples at that frequency. The samples are processed to obtain a cell search measurement, such as PSS SNR. The process is repeated for frequency fo+fd. The measurement results for the respective frequencies are compared. If frequency fo+fd gives a better result than frequency fo then the process obtains a measurement for frequency fo+2*fd. If frequency fo gives a better result than frequency fo+fd, then the process obtains a measurement for frequency fo−fd.

In a second implementation, the WLAN modem 706 tunes to a first frequency, which may correspond to the serving frequency on which the WWAN radio is or was tuned, and collects digital samples. The UE 702 makes cell measurements based on these samples at several frequency offset hypotheses. The UE then interpolates or extrapolates the measurement results and picks the one frequency offset which gives the best measurement result. The interpolation or extrapolation reduces the number of frequency offset hypotheses. As with the first implementation, the UE 702 then proceeds to the normal operation for frequency offset calculation to fine tune the estimation. By the first three steps of the above procedure, the error in the frequency offset is reduced to normal LTE modem frequency offset error. The last step gives the result of the estimation with required accuracy. The number of hypotheses is less than the ratio of the accuracy of WLAN modem to LTE modem.

In a third implementation, the WLAN modem 706 tunes to a first frequency, which may correspond to the serving frequency on which the WWAN radio is or was tuned, and collects digital samples. The UE 702 makes cell measurements based on these samples at several frequency offset hypotheses, and picks the one frequency offset which gives the best measurement result. In this implementation, the number of hypotheses is selected such that the required accuracy can be reached at this step without having to go through regular LTE frequency offset estimation.

In a second concept, during an initial calibration phase, both the LTE radio 704 and the WLAN radio 706 measure target cells 710 on a first frequency which may be the target frequencies, and offsets are computed directly on the desired target frequency. During a tracking phase, frequency and time offset corrections can be applied on the WLAN modem based on the WLAN measurements.

The initial calibration involves frequency and power offset estimation and correction. Measurements are done by both LTE modem 704 and the WLAN modem 706 on the first frequency that may be the target frequency for inter-frequency measurements of the LTE modem. A two-stage coarse frequency estimation involves multiple frequency hypotheses. Further corrections using PSS based frequency estimation may be applied for SSS and other cell measurements. The concept is particularly beneficial for inter-frequency measurements when the serving and target frequencies are in different bands.

During the tracking phase, frequency and time offset corrections can be applied on WLAN modem 706 based on WLAN-obtained cell metric. The tracking phase is particularly useful when WLAN modem 706 and the LTE modem 704 are driven by correlated timing sources. Correlation properties are estimated during calibration phase.

In a baseline operation, the WLAN radio 706 performs inter-frequency measurements, while the WWAN radio 704 performs intra-frequency measurements. In other words, the WLAN modem 706 measures cell(s) on the target frequency and the WWAN modem measures cell(s) on the serving frequency. In accordance with an embodiment, a training or calibration phase is performed during which both the WWAN radio 704 and WLAN radio 706 measure the same cell(s) on the first frequency which may be the target frequency. Accordingly, in an initial calibration step, the WWAN modem 704 tunes away from the serving frequency of the serving cell 708 to obtain measurements on a target frequency of a target cell 710.

Calibration may be characterized as "coarse" or "fine." Coarse or initial calibration may occur when the WWAN modem, e.g., LTE modem, is in an idle state/or connected state discontinuous reception (C-DRX). In this state, the LTE modem 704 is not heavily loaded so it is an opportune time for the LTE modem to assist the WLAN modem 706 in calibration. Fine or correction calibration occurs after the WLAN modem 706 has already obtained some coarse granularity of the offsets. Fine calibration may be done during C-DRX or using autonomous gaps while the LTE modem 704 is in connected mode or during initial measurement gaps. It is to be noted that measurement gaps are not needed after calibration or very infrequently needed for subsequent calibration compared to measurement gaps.

Additional corrections can be applied during a tracking mode. For example, fine frequency offset and timing offset corrections may be obtained based on WLAN-obtained measurements without requiring measurements from the LTE modem 704. This works well if the LTE modem 704 and WLAN modem 706 are driven by correlated timing sources.

Calibration training involves various measurement steps as part of a series of calibration steps, and calibration factor determinations. Training may need to be done periodically depending on the measurement accuracy requirements, drifts in Time Tracking Loop (TTL) and Frequency Tracking Loop (FTL) and the availability of WLAN and WWAN modems for training.

A first calibration step is based on cell metrics obtained by the WWAN modem 704 and the WLAN modem 706. In a first measurement step, the LTE radio 704 tunes away to a target frequency and collects signal samples of over the air signals 714 on the target frequency. The LTE modem 704 processor does PSS/SSS search and ranks the PSS index, PSS SNR, cell id, SSS SNR. Because the LTE modem 704 has a fairly good estimate of the cell timing and frequency offset, the LTE modem does not start with a large frequency offset. Accordingly, the WWAN modem 704 obtains measurements for one frequency hypotheses (e.g., neighbor cell search).

In a second measurement step, the WLAN radio 706 collects signal samples of over the air signals 714 on the target frequency, using multiple frequency hypotheses. For example, if three frequency hypotheses are to be used, the WLAN modem 706 collects samples at frequencies: −2fs/3, 0 and 2fs/3 where fs corresponds to the frequency offset error for the clock source at the target frequency. The signal samples may be provided to the LTE modem 704 for processing. The LTE modem processor does PSS/SSS search and ranks the PSS index, PSS SNR, cell id, SSSN SNR, frequency hypothesis.

In a first calibration step, the WLAN modem 706 selects the frequency hypothesis for which the correlation/agreement of WLAN cell search measurements with the WWAN cell search measurements, e.g., PSS index, PSS SNR, cell id, SSSN SNR, is highest.

In a second calibration step, a power correction occurs. In this calibration step, once a frequency hypothesis is selected by the WLAN modem 706, the difference, e.g., delta, between the PSS SNR obtained during the first measurement step and the PSS SNR obtained during the second measurement is computed. The delta between the SSS SNR obtained during the first measurement step and the SSS SNR obtained during the second measurement step is also computed.

A first calibration factor may be determined as follows:

$$[abs(delta(PSS\ SNR))+abs(delta(SSS\ SNR))]/2$$

where, delta (PSS SNR) and delta (SSS SNR) are expected to have the same direction.

In a third measurement step, the LTE modem processor does Narrow Band cell measurements, e.g., RSRP, RSSI, on samples of over the air signal 714 collected by the LTE radio 704. In a fourth measurement step, the LTE modem processor does Narrow Band cell measurements, e.g., RSRP, RSSI, on samples of over the air signal 714 collected by the WLAN radio 706 using the selected frequency hypothesis.

In a third calibration step, additional power calibrations are performed. Here, the delta between the RSRP values obtained during the third measurement step and the RSRP values obtained during the fourth measurement step is computed. The delta between the RSSI values obtained during the third measurement step and the RSSI values obtained during the fourth measurement step is also computed. This is with factor first calibration factor applied.

A second calibration factor may be determined as follows:

$$[abs(delta(RSRP))+abs(delta(RSSI))]/2$$

where, delta (RSRP) and delta (RSSI) are expected to have the same direction.

In a fourth calibration step, the second calibration factor is applied to measurements for evaluating triggering criteria and for subsequent reports to eNB.

In a fifth calibration step, once coarse frequency offset is estimated and applied (calculated from calibration step 1), fine frequency offset is estimated. Estimation may be performed by dividing a smaller range across the coarse frequency offset and trying multiple hypotheses. The estimation process can be iterative and terminated based on pre-specified thresholds. For SSS detection and narrow band (NB) measurements, fine frequency offset can be estimated from detected PSS sequences and correction can be applied via phase rotation. The UE computes signal quality of the target cell by measuring cell-specific reference signals (CRS), which are spread across the entire frequency bandwidth of the target cell. However, for inter-frequency measurements, the UE typically measures only the central part of the frequency band (e.g. 6 resource blocks). This corresponds to only 1.08 MHz bandwidth (for 6 RBs), while the target cell bandwidth may be much larger (e.g. 5/10/20 MHz). Hence the name "narrowband" measurements.

The preceding processes describe embodiments for performing an initial power and frequency calibration for initial acquisition and locking. After initial calibration is complete, the processes enter into a tracking phase.

As described above, during the calibration training phase, a frequency offset estimate is determined by collecting and comparing samples from both the LTE modem 704 and the WLAN modem 706 on a target frequency. A correction is applied to samples obtained on the WLAN modem 706 based on the initial coarse frequency offset estimate. After calibration training, the frequency offset may be tracked and corrected without reverting to a coarse frequency offset correction. This tracking works best when the timing sources in WLAN radio 706 and WWAN radio 704 are strongly correlated, e.g. driven by common crystal oscillator.

Fine Frequency Offset Correction Algorithm

It is possible to estimate the relative drift between the WLAN modem 706 and LTE modem 704 from multiple measurements during the calibration training phase. Both magnitude and direction of the drift can be estimated. The LTE modem 704 and the WLAN modem 706 may collect samples at predetermined time intervals and compute frequency offsets. The difference between successive frequency offsets is a measure of the relative drift. Effect of estimation error can be reduced by taking multiple measurements. Once the correlation properties of oscillator drift have been determined with a pre-specified accuracy, the training phase can be concluded. In the calibration tracking phase, the WLAN modem 706 can apply frequency offset corrections at regular time intervals based on the oscillator drift calculated from measurements. Exact values of frequency offset corrections, periodicity, etc. may be dependent on specific oscillators.

Time Offset Correction Algorithm

Frequency offset estimates are available as described above. Timing offset can be estimated based on the relationship between frequency offset and timing offset. Corrections can be applied at pre-specified intervals to nullify the effect of timing drift. In one method, the elapsed time between the sample collection for measurements and last PSS timing detection can be used to estimate the time drift. In another method, the PSS timing can be detected from the collected samples (as long as the samples contain PSS sequence) and apply this estimate for measurements. In this case, the net timing offset will be minimal and can be safely ignored.

Figure 8:
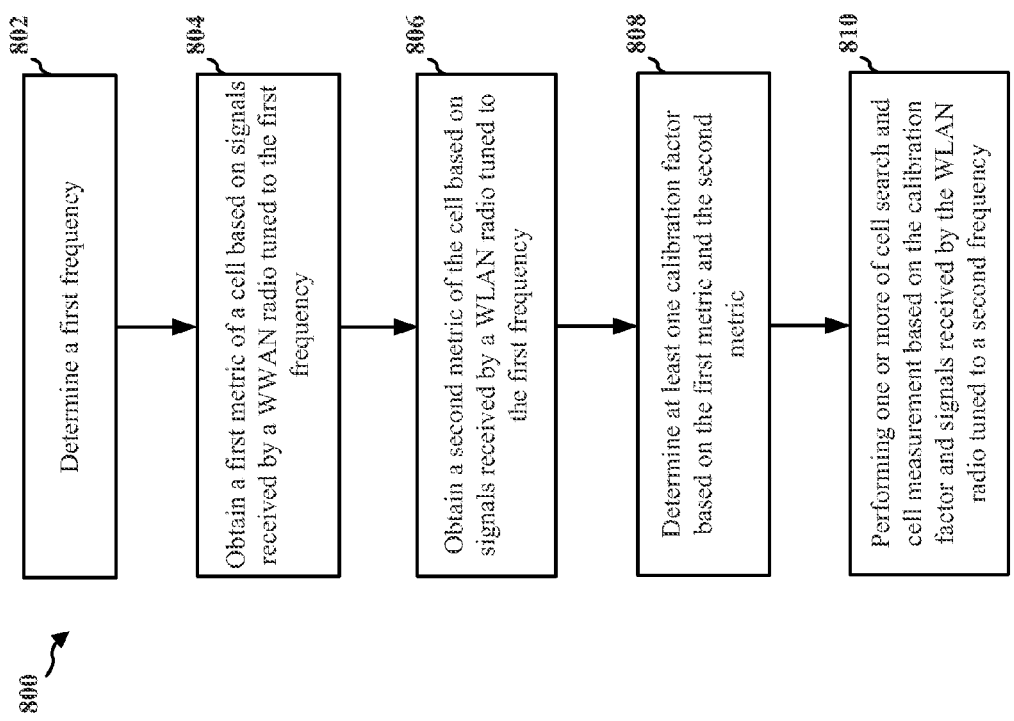
FIG. 8 is a flow chart of a method of wireless communication.

FIG. 8 is a flow chart 800 of a method of wireless communication. The method may be performed by a UE. At step 802, the UE determines a first frequency. In one implementation, the first frequency may be a serving frequency on which a WWAN radio is or was tuned. In another implementation, the first frequency may be a target frequency for inter-frequency measurements of a WWAN radio. The target frequency may be selected by the network, or determined by the UE based on several factors including on which frequencies previous inter-frequency measurements have been obtained. In some embodiments, the second frequency may be same as the first frequency while in other embodiments, the second frequency may be different than the first frequency.

At step 804, UE obtains a first metric of a cell based on signals received by a WWAN radio tuned to the first frequency. At step 806, the UE obtains a second metric of the cell based on signals received by a WLAN radio tuned to the first frequency. The first metric and the second metric are the same type of metric, which may be one or more of a frequency metric, a power metric. At step 808, the UE determines at least one calibration factor based on the first metric and the second metric. The calibration factor may be one or more of a power offset, a frequency offset, and a timing offset.

At step 810, the UE performs one or more of cell search and cell measurement based on the calibration factor and signals received by the WLAN radio tuned to a second frequency. The second frequency may be a frequency for inter-frequency measurement by the WWAN.

In one embodiment, the first frequency is a serving frequency of the WWAN radio. In one arrangement, the first metric and the second metric may be a frequency metric. The second metric is obtained by obtaining a plurality of instances of a signal quality measurement. Each instance is in turn obtained using a different frequency offset hypothesis. The frequency corresponding to the frequency offset hypothesis that results in the best signal quality measurement is selected as the second metric. The calibration factor is determined by calculating a frequency offset based on the first frequency metric and the second frequency metric. In another arrangement of the first embodiment, the first metric is first power metric and the second metric is a second power metric. In this case, the calibration factor is determined by calculating a difference between the first power metric and the second power metric.

In another embodiment, the first frequency is target frequency for inter-frequency measurements of the WWAN radio. In this case, the first metric may be one or more of a cell search metric, e.g., PSS index, PSS SNR, cell id, and SSS SNR obtained using a single frequency hypothesis. The second metric may be a plurality of instances of one or more of a corresponding cell search metric, e.g., PSS index, PSS SNR, cell id, and SSS SNR, where each of the plurality of instances is obtained using a different frequency hypothesis. Here, the calibration factor is based on a first calibration factor that in turn is based on a selected frequency hypothesis that results in the second metric having the highest correlation to the first metric obtained. The first metric may further include an additional first metric obtained using the single frequency hypothesis. The second metric may further include an additional second metric obtained based on the selected frequency hypothesis and the first calibration factor. The first additional metric and the second additional metric may be one or more of RSRP and RSSI. The calibration factor is further based on a second calibration factor that in turn is based on the first additional metric and the additional second metric. A relative drift between the WLAN radio and the WWAN radio may be determined based on successive first metrics and successive second metrics. A frequency offset correction may be applied to the cell search measurement based on the determined drift.

Figure 9:
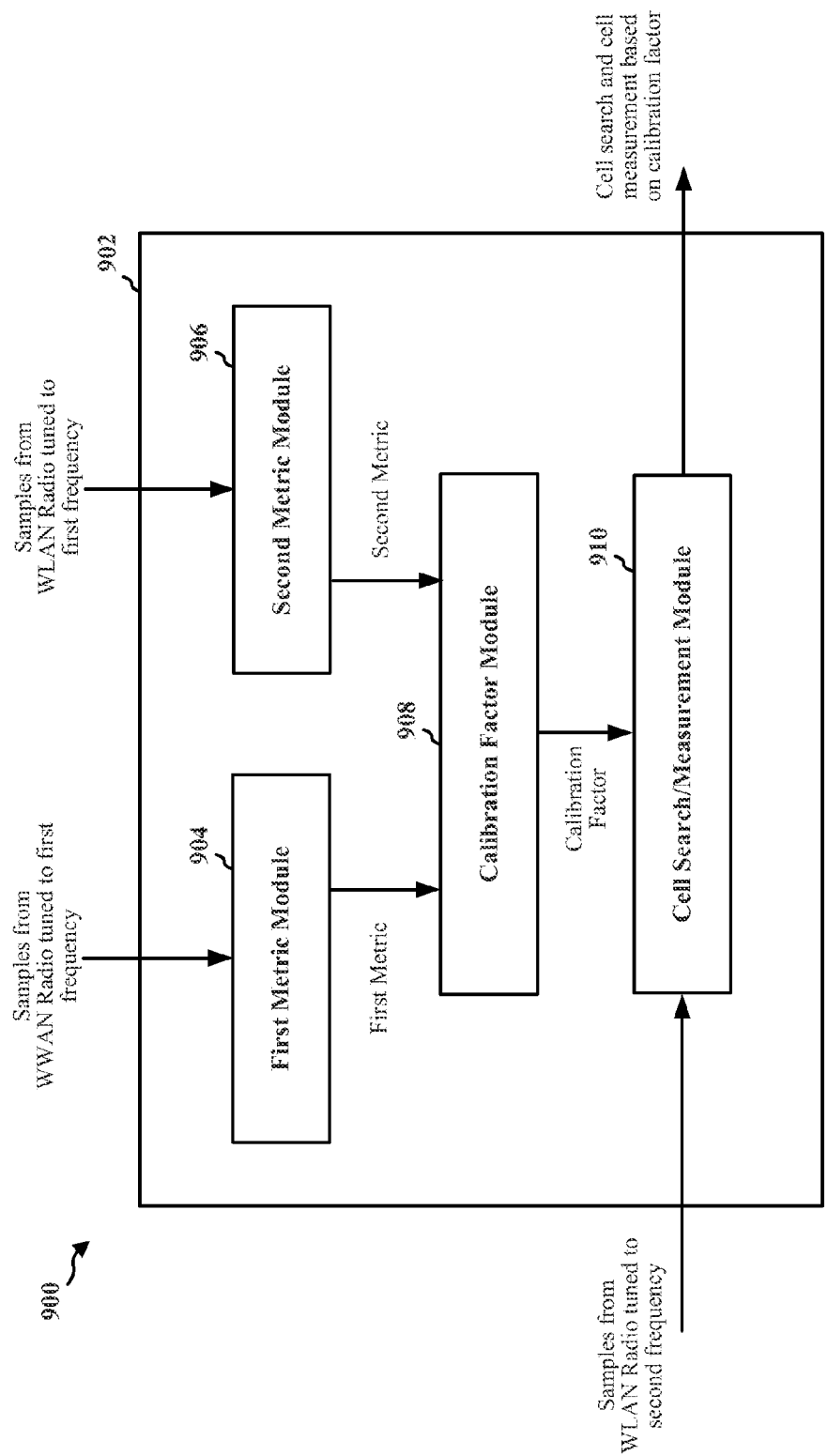
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus 902 may be a UE. The UE may include both a WWAN radio (not shown) and a WLAN radio (not shown). The apparatus 902 includes a first metric module 904, a second metric module 906, a calibration factor module 908, and a cell search/measurement module 910.

The first metric module 904 obtains a first metric of a cell based on signals received by a WWAN radio tuned to a first frequency. The signals are samples of an over the air signal on the first frequency. The first frequency may be a serving frequency of the serving cell to which the UE is connected or it may be a target frequency of a neighbor cell for interfrequency measurements of the WWAN radio. The second metric module 906 obtains a second metric of the cell based on signals received by a WLAN radio tuned to the common frequency. The calibration factor module 908 determines a calibration factor based on the first metric and the second metric. The cell search/measurement module 910 obtains cell search and cell measurements based on the calibration factor and signals received by the WLAN radio tuned to a second frequency.

The apparatus 902 may include additional modules that perform each of the steps of the algorithm in the aforementioned flow chart of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
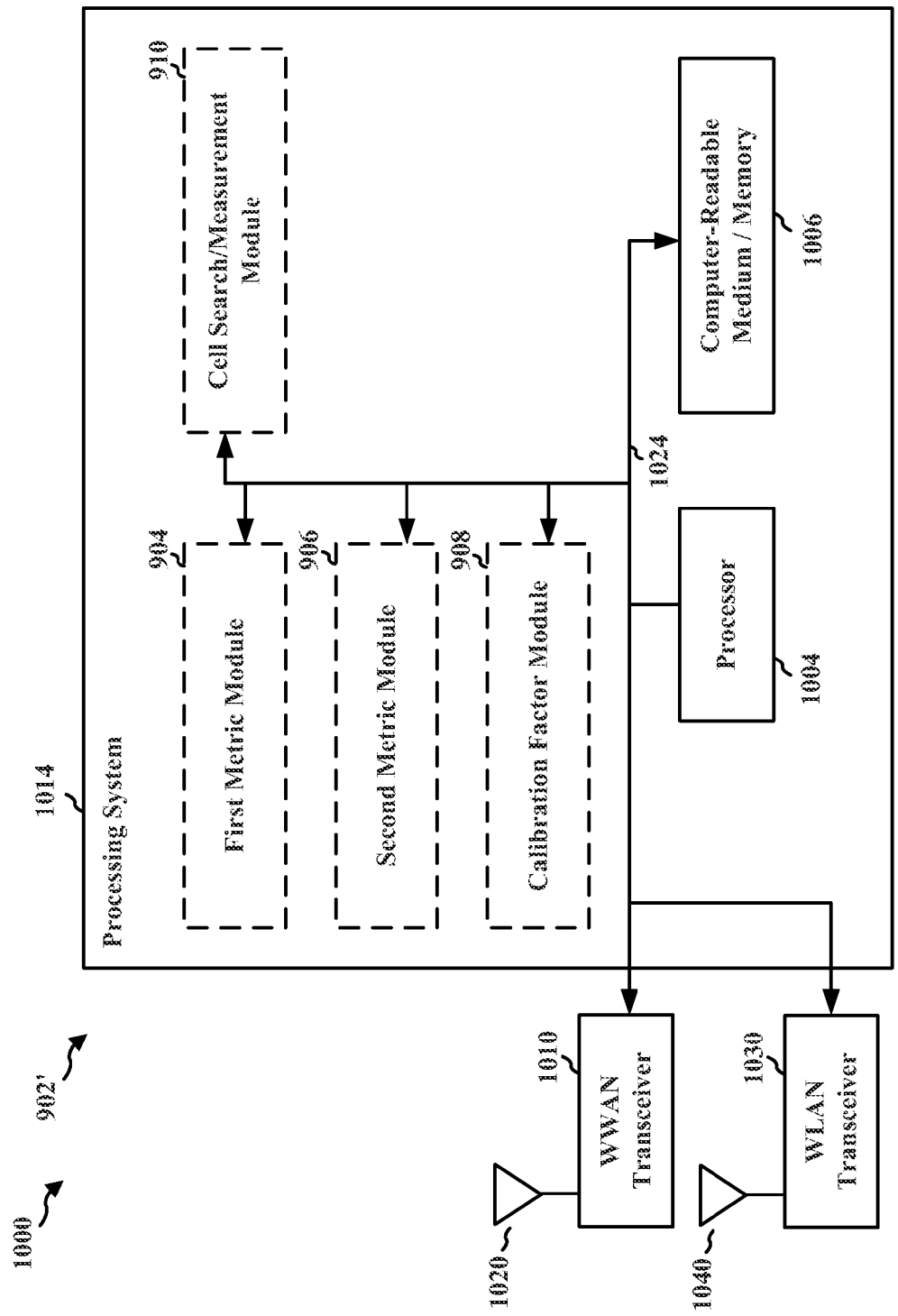
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a WWAN transceiver 1010 and a WLAN transceiver 1030. The WWAN transceiver 1010 is coupled to one or more antennas 1020. Likewise, the WLAN transceiver 1030 is coupled to one or more antennas 1040. The respective transceivers 1010, 1030 provide means for communicating with various other apparatus over a transmission medium. The transceivers 1010, 1030 receive signals from the one or more antennas 1020, 1040, extract information from the received signals, and provide the extracted information to the processing system 1014. More specifically, the WWAN transceiver provides information to the first metric module 904 and the WLAN transceiver 1030 provided information to the second metric module 906.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908 and 910. The modules may be software modules running in the processor 1004, resident/stored in the computer readable medium/memory 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means for determining a first frequency, means for obtaining a first metric of a cell based on signals received by a WWAN radio tuned to a first frequency, means for obtaining a second metric of the cell based on signals received by a WLAN radio tuned to the first frequency, means for determining a calibration factor based on the first metric and the second metric, and means for performing one or more of cell search and cell measurement based on the calibration factor and signals received by the WLAN radio tuned to a second frequency. The apparatus 902/902' may also include means for determining a relative drift between the WLAN radio and the WWAN radio based on successive first metrics and successive second metrics, and means for applying a frequency offset correction based on the determined drift.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means, including both the functions related to the processing of signal samples extracted by the WWAN radio and signal samples extracted by the WLAN radio.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    obtaining a first metric based on signals received by a wireless wide area network (WWAN) radio tuned to a first frequency, the first metric comprising a cell search metric obtained using a single frequency hypothesis;
    obtaining a second metric based on signals received by a wireless local area network (WLAN) radio tuned to the first frequency, the second metric comprising a plurality of instances of a cell search metric, wherein each of the plurality of instances is obtained using a different frequency hypothesis; and
    determining at least one calibration factor based on the first metric and the second metric,
    wherein the first frequency is a target frequency for inter-frequency measurements of the WWAN radio.

2. The method of claim 1, wherein the first metric and the second metric are the same type of metric.

3. The method of claim 2, wherein the type of metric is one of a frequency metric, a power metric and a time metric.

4. The method of claim 1, wherein the at least one calibration factor may be one or more of a power offset, a frequency offset, and a timing offset.

5. The method of claim 1, further comprising performing one or more of cell search and cell measurement based on the at least one calibration factor and signals received by the WLAN radio tuned to a second frequency.

6. The method of claim 1, wherein the target frequency may be selected by the network, or determined by the UE based on several factors including those frequencies on which inter-frequency measurements were previously obtained.

7. The method of claim 1, wherein the cell search metric comprises one or more of a PSS index, a PSS SNR, a cell id and a SSS SNR.

8. The method of claim 1, wherein the at least one calibration factor is based on a first calibration factor that in turn is based on a selected frequency hypothesis that results in the second metric having a highest correlation to the first metric obtained.

9. The method of claim 8, wherein:
    the first metric further comprises a first additional metric obtained using the single frequency hypothesis;
    the second metric further comprises a second additional metric obtained based on the selected frequency hypothesis and the first calibration factor; and
    the at least one calibration factor is further based on a second calibration factor that in turn is based on the first additional metric and the additional second metric.

10. The method of claim 9, wherein the first additional metric and the second additional metric comprise a cell measurement metric.

11. The method of claim 10, wherein the cell measurement metric comprises one or more of RSRP and RSSI.

12. The method of claim 1, further comprising:
    determining a relative drift between the WLAN radio and the WWAN radio based on successive first metrics and successive second metrics; and
    applying a frequency offset correction based on the determined drift.

13. An apparatus for wireless communication, comprising:
    means for obtaining a first metric based on signals received by a wireless wide area network (WWAN) radio tuned to a first frequency, the first metric comprising a cell search metric obtained using a single frequency hypothesis;
    means for obtaining a second metric based on signals received by a wireless local area network (WLAN) radio tuned to the first frequency, the second metric comprising a plurality of instances of a cell search metric, wherein each of the plurality of instances is obtained using a different frequency hypothesis; and
    means for determining at least one calibration factor based on the first metric and the second metric,
    wherein the first frequency is a target frequency for inter-frequency measurements of the WWAN radio.

14. The apparatus of claim 13, wherein the first metric and the second metric are the same type of metric.

15. The apparatus of claim 14, wherein the type of metric is one of a frequency metric, a power metric and a time metric.

16. The apparatus of claim 13, wherein the at least one calibration factor may be one or more of a power offset, a frequency offset, and a timing offset.

17. The apparatus of claim 13, further comprising means for performing one or more of cell search and cell measurement based on the at least one calibration factor and signals received by the WLAN radio tuned to a second frequency.

18. The apparatus of claim 13, wherein the target frequency may be selected by the network, or determined by the UE based on several factors including those frequencies on which inter-frequency measurements were previously obtained.

19. The apparatus of claim 13, wherein the cell search metric comprises one or more of a PSS index, a PSS SNR, a cell id and a SSS SNR.

20. The apparatus of claim 13, wherein the at least one calibration factor is based on a first calibration factor that in turn is based on a selected frequency hypothesis that results in the second metric having a highest correlation to the first metric obtained.

21. The apparatus of claim 20, wherein:
    the first metric further comprises a first additional metric obtained using the single frequency hypothesis;
    the second metric further comprises a second additional metric obtained based on the selected frequency hypothesis and the first calibration factor; and
    the at least one calibration factor is further based on a second calibration factor that in turn is based on the first additional metric and the additional second metric.

22. The apparatus of claim 21, wherein the first additional metric and the second additional metric comprise a cell measurement metric.

23. The apparatus of claim 22, wherein the cell measurement metric comprises one or more of RSRP and RSSI.

24. The apparatus of claim 13, further comprising:
means for determining a relative drift between the WLAN radio and the WWAN radio based on successive first metrics and successive second metrics; and
means for applying a frequency offset correction based on the determined drift.

25. An apparatus for wireless communication, comprising:
a memory; and
at least one processor coupled to the memory and configured to:
obtain a first metric based on signals received by a wireless wide area network (WWAN) radio tuned to a first frequency, the first metric comprising a cell search metric obtained using a single frequency hypothesis;
obtain a second metric based on signals received by a wireless local area network (WLAN) radio tuned to the first frequency, the second metric comprising a plurality of instances of a cell search metric, wherein each of the plurality of instances is obtained using a different frequency hypothesis; and
determine at least one calibration factor based on the first metric and the second metric,
wherein the first frequency is a target frequency for inter-frequency measurements of the WWAN radio.

26. The apparatus of claim 25, wherein the at least one processor is further configured to perform one or more of cell search and cell measurement based on the at least one calibration factor and signals received by the WLAN radio tuned to a second frequency.

27. A computer-readable medium storing computer executable code for wireless communication, comprising code for:
obtaining a first metric based on signals received by a wireless wide area network (WWAN) radio tuned to a first frequency, the first metric comprising a cell search metric obtained using a single frequency hypothesis;
obtaining a second metric based on signals received by a wireless local area network (WLAN) radio tuned to the first frequency, the second metric comprising a plurality of instances of a cell search metric, wherein each of the plurality of instances is obtained using a different frequency hypothesis; and
determining at least one calibration factor based on the first metric and the second metric,
wherein the first frequency is a target frequency for inter-frequency measurements of the WWAN radio.

28. The computer-readable medium of claim 27, further comprising code for performing one or more of cell search and cell measurement based on the at least one calibration factor and signals received by the WLAN radio tuned to a second frequency.

* * * * *